(No Model.)

J. BRUSS.
TABLE.

No. 573,960. Patented Dec. 29, 1896.

Witnesses:
Geo. W. Young
N. E. Oliphant

Inventor:
Julius Bruss
By H. G. Underwood
Attorneys

UNITED STATES PATENT OFFICE.

JULIUS BRUSS, OF MILWAUKEE, WISCONSIN.

TABLE.

SPECIFICATION forming part of Letters Patent No. 573,960, dated December 29, 1896.

Application filed March 28, 1896. Serial No. 585,197. (No model.)

*To all whom it may concern:*

Be it known that I, JULIUS BRUSS, a citizen of the United States, and a resident of Milwaukee, in the county of Milwaukee and State of Wisconsin, have invented certain new and useful Improvements in Tables; and I do hereby declare that the following is a full, clear, and exact description thereof.

My invention has for its object to provide a simple, economical knockdown table of the kind especially designed for the saloon trade; and it consists in certain peculiarities of construction and combination of parts hereinafter set forth with reference to the accompanying drawings and subsequently claimed.

Figure 1:
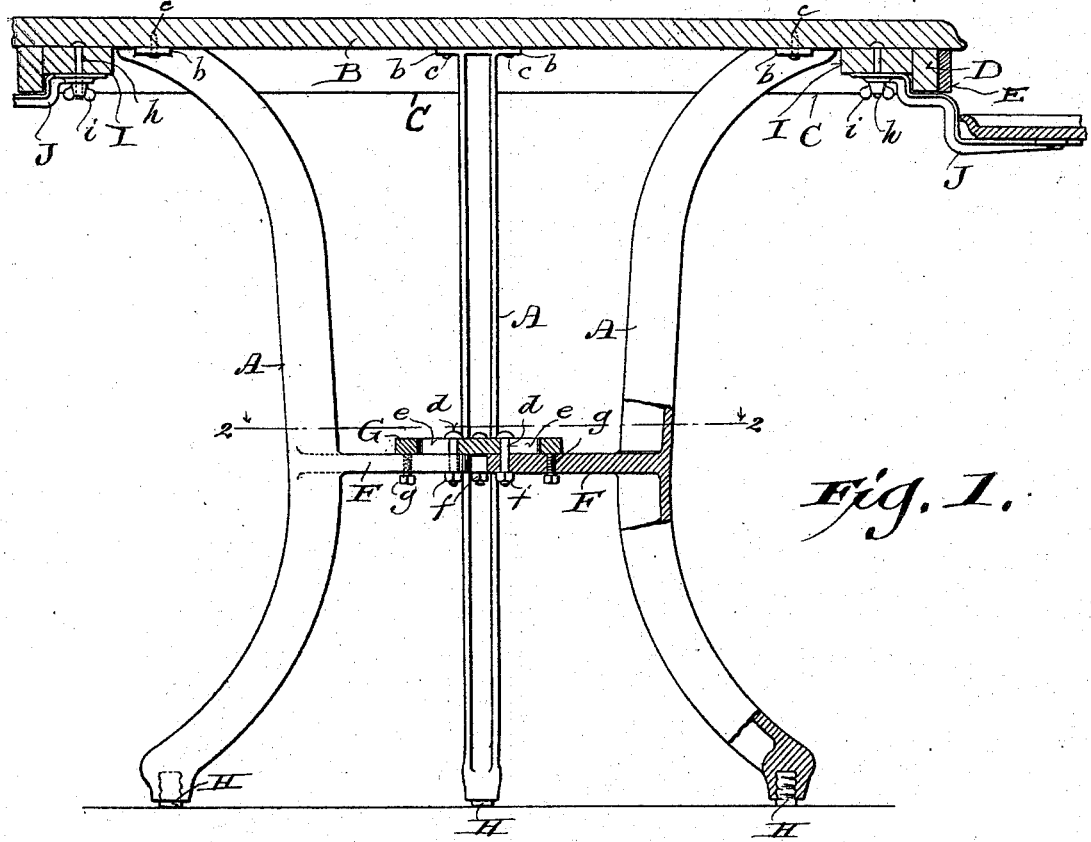
Figures 2, 3:
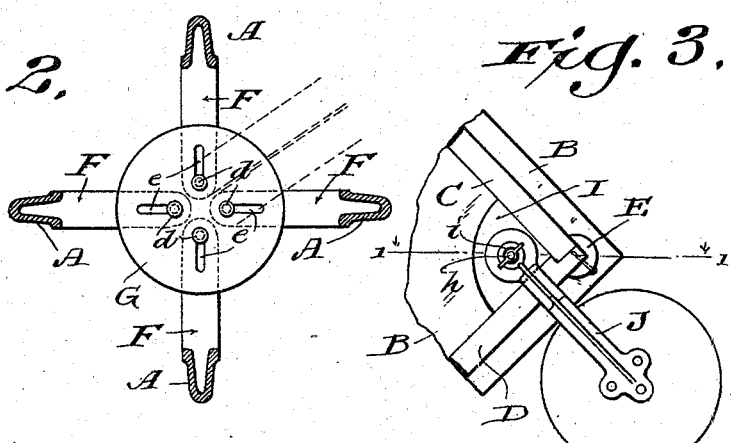

In the drawings, Figure 1 represents a sectional view of my improved table on the plane indicated by line 1 1 of Fig. 3; Fig. 2, a horizontal section taken on line 2 2 of Fig. 1, and Fig. 3 a plan view of one corner of the table inverted.

Referring by letter to the drawings, A represents the legs of my table, these legs being preferably cast-iron and of such contour as to be out of the way of persons seated at said table. By making the metal legs for the most part V-shaped in horizontal section a saving of weight and material is effected without sacrifice of rigidity. The upper end of each leg is shown provided with lateral ears $b$, that are made fast to the under side of the table-top B by screws $c$ or other suitable means, this table-top being of wood and provided with a valance, the latter comprising rails C and D, the latter being rabbeted at their ends to receive the meeting ends of the others, and the joints are concealed by vertical beads E, fastened to the rabbeted rails. By this construction and arrangement of parts provision is made for concealing spread joints.

Each of the legs A is provided with a horizontal inwardly-extending arm F intermediate of its extremities, and a radially-slotted plate G is shown supported on the converging leg-arms. Bolts $d$ are run through the plate-slots $e$ and leg-arms F to engage with nuts $f$, while set-screws $g$ turn in said arms to bear against the under side of the plate. The bolts and nuts clamp the plate to the leg-arms, and either of the set-screws $g$ may be adjusted to vary the angle of the plate G and thus compensate for slight inequalities in the length of the legs or irregularities in the floor upon which they stand.

The legs A are preferably cast with spirally-threaded vertical sockets at their lower ends, and blocks H of wood are forced into these sockets by rotation, these blocks being adjusted to compensate for inequalities in the length of legs or irregularities in the floor upon which they stand.

The plate G being radially slotted where it opposes the leg-arms, the spread of the legs may be varied within certain limits for table-tops of varying dimensions, but it is within the scope of my invention to make said plate otherwise than slotted.

When the table-top B is removed and the bolts $d$ loosened, the legs may be swung together in pairs, as shown by dotted lines in Fig. 2, for the sake of convenience in the matter of storage and transportation.

Set in the angles between rails C and D of the top valance are blocks I, provided with pivots $h$ for tray-arms J, and the latter are shown held in place upon the pivots by thumb-nuts $i$, whereby provision is made for their ready removal or for locking them in adjusted position.

The tray-arms are of such contour that when swung out they will come against valance-rails of the table-top and stand at right angles to the same, their play being thus limited.

Having thus described my invention, what I claim as new, and desire to secure by Letters Patent, is—

1. A table having each leg thereof provided with a horizontal inwardly-extending arm intermediate of its extremities, a horizontal stay-plate laid against the leg-arms and provided with radial slots opposing the same, bolts engaging the plate-slots and leg-arms, and nuts run on the bolts.

2. A table having its legs provided with inwardly-extending arms intermediate of their extremities, a stay-plate in bolt connection with the arms, and set-screws arranged to vary the angle of the plate with respect to said legs.

3. A table having its legs provided with inwardly-extending arms intermediate of their extremities, a stay-plate in bolt connection with the arms, and set-screws that turn in said arms against the plate.

4. A table having its top provided with an angular valance, blocks set in the corners formed by the valance, pivots depending from the blocks, tray-arms loose on the pivots, and thumb-nuts run on said pivots in opposition to the tray-arms.

In testimony that I claim the foregoing I have hereunto set my hand, at Milwaukee, in the county of Milwaukee and State of Wisconsin, in the presence of two witnesses.

JULIUS BRUSS.

Witnesses:
N. E. OLIPHANT,
FRED RITTER.